March 21, 1961  R. COLOMBO  2,975,472
METHOD AND APPARATUS FOR BLOWING HOLLOW PLASTIC ARTICLES
Filed Sept. 3, 1958
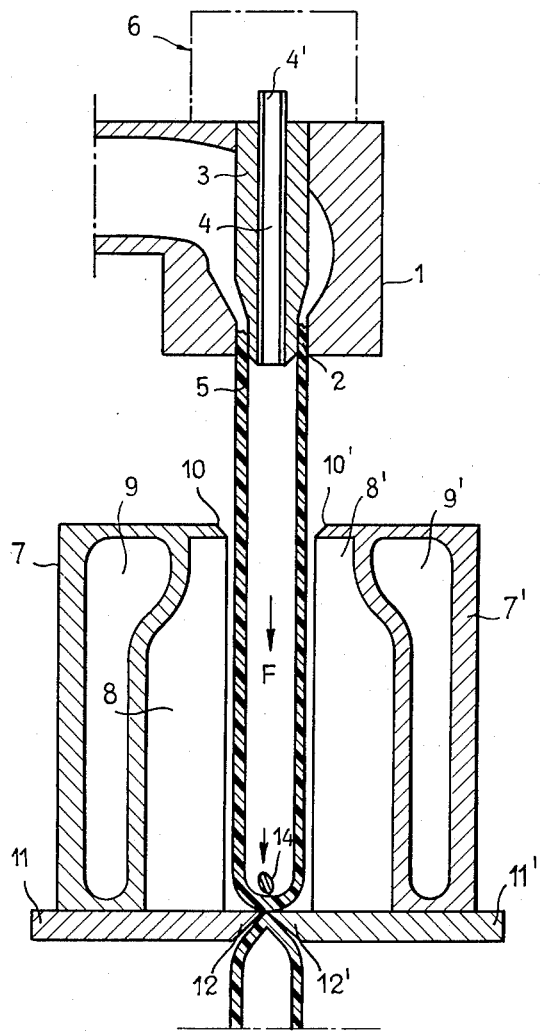

United States Patent Office 2,975,472
Patented Mar. 21, 1961

2,975,472

METHOD AND APPARATUS FOR BLOWING HOLLOW PLASTIC ARTICLES

Roberto Colombo, Turin, Italy, assignor to S.A.S. Lavorazione Materie Plastiche (L.M.P.) di M. I. Colombo & C., Turin, Italy Filed Sept. 3, 1958, Ser. No. 758,766

Claims priority, application Italy Sept. 10, 1957

3 Claims. (Cl. 18—5)

This invention relates to the manufacture of hollow articles from thermoplastic materials, such as polyethyene, in which a tube of softened thermoplastic material is extruded through an annular nozzle, a tube portion is claimped between a pair of mould halves forming a divided mould, whereupon the tube portion is expanded against the internal would surfaces by means of an expanding fluid.

Two fundamental methods are known in this field.

In one method, which is substantially of the intermittent type, the extrusion nozzle has initially associated therewith a counter-mould which may be constituted by the bottom of the divided mould or an additional small mould, in order to close the forward end of the tubular section still to be extruded through the nozzle, whereupon the tube is extruded into the divided mould holding its opposite end connected with a source of pressure fluid in order to expand the said tubular mould. Finally, after expansion and hardening, the shaped portion forming the hollow article is cut off, the process being repeated on the next tubular portion.

The other fundamental method is decidedly of a continuous character and differs from the former in that both ends of the divided mould, moving synchronously with the extruded pipe, are simultaneously clamped on the pipe, the expanding fluid being admitted into the pipe portion thus closed off through a sort of hypodermic needle. It will be clear to any expert in the branch that the second process is certainly more expeditious than the former in which the extrusion nozzle is so to say monopolized by a mould during the full time required for full shaping and hardening of the hollow article which requires the extruded tubular portion to constantly connect through a suitable passage in the extrusion head with the expanding fluid source.

The improved process for manufacturing hollow articles from thermoplastic material by extruding a tube of thermoplastic material and expanding a portion of the said tube by means of a pressure fluid in a divided mould is chiefly characterized by the steps of clamping the tube fluid-tight at the mould end remote from the extrusion nozzle, introducing through the tube end attached to the nozzle a gas yielding material which is arranged within the region of the longitudinal mould dimension, clamping the tube fluid-tight at the mould end nearer the extrusion nozzle in order to confine within the mould the tube portion containing the gas yielding substance, holding the said tube portion in the mould long enough for the gas yielding substance to volatilize and expand the tube portion against the inner would surface and for the thermoplastic material to harden and stripping the hollow article from the mould.

Further characteristic features and advantages of this method and apparatus therefor will be understood from the appended description referring to the accompanying drawing which is an axial sectional view of an embodiment of the main components of the apparatus.

An extrusion press, preferably of the screw press type, is shown on the drawing by its extrusion head 1, comprising in a manner known per se an annular extrusion nozzle 2 internally confined by a coaxial plug 3. The plug 3 has a coaxial conduit 4 extending therethrough, the lower end of which is adapted to connected with the inside of a tube of thermoplastic material extruded through the nozzle, the top end 4' of which, instead of connecting with a pressure fluid source, has associated therewith means diagrammatically denoted by 6 adapted to periodically admit into the tube 5 through conduits 4 a gas yielding substance.

Suitable gas yielding substances for carrying out this method are generally those employed for instance in the manufacture of spongy rubber, such as ammonium carbonate or the material known by the trade name "Algophon," manufactured by E. I. du Pont de Nemours and Co. In contact with hot thermoplastic material, such substances promptly volatilize generating carbon dioxide, ammonia or other gases. For use in the improved method this gas yielding substance is preferably compressed to tablet form, the tablet weight being proportional to the volume of the hollow article to be manufactured in order to obtain an expansion pressure within the desired limits.

It will therefore be understood that the means 6 generally comprises a tablet container such as to cause a tablet to drop through the conduit 4 every time the tubular portion 5 has been prepared for receiving it.

Arrangement of the tube 5 for receiving the gas yielding substance tablet is performed by the divided moulds, a considerable number of which can be provided in a manner known per se so as to become successively aligned with the tube 5. The drawing shows one such divided mould only, for it will be obvious that the arrangement of a plurality of such moulds on endless chains or rotary tables is known through a large number of publications in this field and is no novelty.

The mould shown on the drawing comprises two would halves 7, 7' having operative surfaces 8, 8' of a profile matching a bottle shape and cooling jackets 9, 9'. The mould halves each end at the top by a lip 10, 10', respectively, their bottom portion comprising a metal plate 11, 11' having a lip 12, 12', respectively. Each element 7, 7'; 11, 11' has associated therewith means known per se not shown on the drawing for moving the associated element transversely of the tube 5. Such means can comprise for instance double acting hydraulic or pneumatic jacks or electromagnets or guides having cam shaped surfaces to move their associated elements towards and from the tube 5 at the proper time as explained hereafter.

In operation the press is actuated to continuously extrude from the head 1 a tube 5. The rate of speed of the mould carrying chain or rotary table is moreover synchronized to cause the moulds to move with a linear translational speed equalling or somewhat exceeding the extrusion rate of the tube 5 so that each open mould can come into alignment with the tube 5. When a mould, such as the one shown is aligned with the tube, the plates 11, 11' are moved towards each other to tightly clamp the tube 5 as shown. Directly thereafter the means 6 throws through the conduit 4 a gas yielding substance tablet 14, which stops in the position shown on the bottom of the tubular portion 5, i.e. within the region of the longitudinal dimension of the mould, whereupon the two mould halves 7, 7' are moved towards each other, so that their top lips 10, 10' clamp the tube 5 fluid-tight at the top mould end. This confines within the mould a portion of the tube 5, the inside of which is shut off from the remaining tube portion. In the meantime the tablet 14 is converted to gas by effect of heat emanated by the hot thermoplastic material of the tube 5, thereby raising the internal pressure in the tubular portion clamped within the mould and causing the said tubular portion to expand into contact with the shaped mould surface 8, 8'. The mould is kept closed till the tablet 14 has substantially volatilized and the thermoplastic material hardens in contact with the cooled mould halves, whereupon the element 7, 11 on the one side and elements 7', 11' on the other hand are withdrawn from the tube 5 in order to strip off the manufactured hollow article.

It will be seen that as the above steps are performed the mould is fed in the direction of the arrow F together with the tube 5 so that, as soon as the top lips 10, 10' have gripped the tube, the next mould can be brought into alignment with the overlying tubular portion, gripping the latter by its lower lips, a further tablet 14 being thrown into the tube, the mould being closed, etc., as described with reference to the mould shown. The process is therefore clearly of a continuous character.

However, it will be understood that to this end the actions of the elements 7, 7', 11, 11', and 6 should be mutually synchronized for gripping by the lower lips to be followed by introduction of the tablet 14 and gripping by the top lips 10, 10'. Such synchronization does not meet with any special difficulties and will be carried out in accordance with the particular manner of operating the mould halves and structure of the means 6 for introducing the tablet. So, for instance assuming the plates 11, 11' meet at a given point on their path cam-shaped profiles which cause them to clamp the tube 5, an electric switch can be arranged on the same path for actuation by either plate 11, 11' the position shown, the said switch being associated with the control circuit for the tablet introducing means 6, so that the said means throws a tablet into the tube, whereupon the mould halves 7, 7' are closed by the same cam-shaped means which have just closed the plates 11, 11'.

Further synchronizing means can be employed without departing from the scope of this invention. Moreover, it is clear that this method can be carried out discontinuously by using one mould only although this slows down production.

It will moreover be seen that the mould structure as shown can be reversed. In other words, the elements 7, 7' can be made integral with the bottom portions and lower lips, the top lips 10, 10' being made movable as described in connection with the plates 11, 11'. Alternatively, mould halves integral with their respective top and lower lips can be employed, such mould halves being brought against the tube 5 so as to first close the lower mould end, and the top end next, thereby making a short period of time available for introducing the tablet.

It will be understood from the above description by any expert in the branch that this invention provides a method and apparatus having an hourly output enormously higher than the first fundamental known method referred to, while avoiding the drawback of the further fundamental known method mentioned above, residing in the waste of thermoplastic material to provide a region for introducing the needle which has subsequently to be cut off and discarded. The successive moulds employed by the improved process can be arranged very close to one another, thereby making the best possible use of the thermoplastic material.

It will be understood that a number of further modifications which are not being explicitly mentioned, can be made without departing from the scope of this invention.

What I claim is:

1. The method of manufacturing a hollow article from a thermoplastic material by extruding a tube of the material in a softened condition and expanding a portion of the tube in a sectional mould, comprising the steps of first clamping and sealing the leading end of the portion of the tube, while maintaining the portion attached to the parent body of the tube, then introducing a gas yielding material into the said portion through the parent body of the tube, clamping and sealing said parent body end of the said portion, and expanding said portion to conform to the interior of said sectional mold by the gas pressure generated from the gas yielding material in the wholly closed portion of said tube.

2. The method of manufacturing a hollow article from a thermoplastic material by extruding a tube of the material in a softened condition and expanding a portion of the tube in a sectional mould, comprising clamping and sealing the tube at the end of the mould which is remote from the extrusion nozzle, while maintaining the tube attached to the nozzle, then introducing through an approximately vertical straight conduit opening into the tube end attached to the nozzle a pellet of gas yielding material into the portion of the tube comprised within the length of the mould, clamping and sealing the tube at the nozzle end of the mould to confine the said portion within the mould, expanding the said portion within the mould by means of the gas yielding material generating a gas pressure sufficient to expand the said portion against the inner surface of the mould, hardening the thermoplastic material in said mould, and opening said sectional mould to remove said article.

3. Apparatus for manufacturing a hollow article from a thermoplastic material comprising an extrusion head, a downwardly facing annular extrusion nozzle in the head including an axial core, an axial open ended passage through the core, means associated with the upper end of the passage for introducing therethrough a gas yielding material into a tube being extruded from the nozzle, and a sectional mold associated with the head, said mold being adapted to close first at its end remote from its nozzle and then at its opposite end, said mold having a pair of clamping lips on each of its opposite ends for clamping and sealing said tube at each of said opposite ends of said mold in the order that said mold is adapted to close, said first clamping and sealing preceding the introduction of said gas yielding material into said tube through said core passage and said last clamping and sealing following said introduction of said gas yielding material.

References Cited in the file of this patent

UNITED STATES PATENTS

| | | |
|---|---|---|
| 1,107,386 | Voelker | Aug. 18, 1914 |
| 1,535,354 | Steele et al. | Apr. 28, 1925 |
| 1,585,759 | Bulley | May 25, 1926 |
| 2,484,965 | Slaughter | Oct. 18, 1949 |
| 2,575,138 | Slaughter | Nov. 13, 1951 |
| 2,597,558 | Bailey | May 20, 1952 |

FOREIGN PATENTS

| | | |
|---|---|---|
| 205,435 | Australia | Aug. 23, 1956 |
| 1,104,304 | France | June 8, 1955 |
| 1,114,897 | France | Dec. 26, 1955 |
| 1,123,500 | France | June 11, 1956 |
| 677,212 | Great Britain | Aug. 13, 1952 |